(12) United States Patent
Smith

(10) Patent No.: US 11,561,671 B2
(45) Date of Patent: Jan. 24, 2023

(54) SYSTEM AND METHOD FOR LEVERAGING MACHINE LEARNING TO DELIVER TIME-SENSITIVE CONTENT OVER OPTIMAL DEVICES AND CHANNELS

(71) Applicant: Disney Enterprises, Inc., Burbank, CA (US)

(72) Inventor: Tony R. Smith, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 241 days.

(21) Appl. No.: 15/073,579

(22) Filed: Mar. 17, 2016

(65) Prior Publication Data
US 2017/0272505 A1 Sep. 21, 2017

(51) Int. Cl.
| | |
|---|---|
| *G06F 3/04817* | (2022.01) |
| *H04L 51/04* | (2022.01) |
| *H04N 21/475* | (2011.01) |
| *H04L 67/306* | (2022.01) |
| *H04N 21/258* | (2011.01) |
| *G06F 3/04847* | (2022.01) |
| *H04L 51/214* | (2022.01) |
| *H04L 67/50* | (2022.01) |

(Continued)

(52) U.S. Cl.
CPC ...... *G06F 3/04817* (2013.01); *G06F 3/04847* (2013.01); *H04L 51/04* (2013.01); *H04L 51/214* (2022.05); *H04L 67/306* (2013.01); *H04L 67/535* (2022.05); *H04N 21/25891* (2013.01); *H04N 21/4755* (2013.01); *H04N 21/4758* (2013.01); *G06N 5/022* (2013.01); *G06N 5/047* (2013.01); *G06N 20/00* (2019.01)

(58) Field of Classification Search
CPC ......... G06Q 10/10; H04W 4/50; H04L 51/14; H04L 51/36; H04L 51/04; H04L 67/22; G06N 20/00; G06F 3/04817
See application file for complete search history.

(56) References Cited

U.S. PATENT DOCUMENTS

| | | | |
|---|---|---|---|
| 8,019,834 B2 * | 9/2011 | Horvitz ................ | G05B 19/404 |
| | | | 709/217 |
| 8,060,139 B2 * | 11/2011 | Yaqub ................. | H04L 63/0853 |
| | | | 455/558 |

(Continued)

*Primary Examiner* — Nhat Huy T Nguyen
(74) *Attorney, Agent, or Firm* — Artegis Law Group, LLP

(57) ABSTRACT

Systems and methods are described for leveraging machine learning to deliver time-sensitive media content offers to a consumer over an optimal device and channel. In an implementation, a server system transmits media content offers over an optimal device and channel to a user. The server system captures metadata of at least one of: the user's use of multiple devices, the user's media content preferences, the user's preferred transmission channels for receiving media content offers over the multiple devices, and the user's preferred times for receiving media content offers. The server system prepares a media content offer for transmission to the user. Based on the captured metadata, the server system selects a user device of the multiple user devices and a transmission channel of multiple transmission channels to transmit the media content offer; and transmits the media content offer to the selected user device over the selected transmission channel.

20 Claims, 4 Drawing Sheets

(51) Int. Cl.
G06N 20/00 (2019.01)
G06N 5/04 (2006.01)
G06N 5/02 (2006.01)

(56) References Cited

U.S. PATENT DOCUMENTS

| | | | | |
|---|---|---|---|---|
| 8,271,334 B1* | 9/2012 | Funk | ......... | G06Q 30/0639 |
| | | | | 705/14.73 |
| 9,248,373 B2* | 2/2016 | Reed | ......... | A63F 13/12 |
| 9,282,073 B1* | 3/2016 | Avital | ......... | H04L 51/26 |
| 9,749,455 B2* | 8/2017 | Chung | ......... | H04L 45/306 |
| 2001/0055963 A1* | 12/2001 | Cloutier | ......... | H04W 4/12 |
| | | | | 455/417 |
| 2002/0154162 A1* | 10/2002 | Bhatia | ......... | G06Q 30/06 |
| | | | | 715/745 |
| 2008/0147484 A1* | 6/2008 | Davis | ......... | G06Q 30/0267 |
| | | | | 705/14.53 |
| 2016/0275532 A1* | 9/2016 | Treiser | ......... | G06Q 30/0201 |
| 2016/0366075 A1* | 12/2016 | Dong | ......... | H04L 67/306 |

\* cited by examiner

SYSTEM AND METHOD FOR LEVERAGING MACHINE LEARNING TO DELIVER TIME-SENSITIVE CONTENT OVER OPTIMAL DEVICES AND CHANNELS

TECHNICAL FIELD

The present disclosure relates generally to delivering time-sensitive content to a device, and more particularly, to a system and method for leveraging machine learning to deliver media content offers to a device.

BRIEF SUMMARY OF THE DISCLOSURE

In accordance with embodiments of the technology disclosed herein, systems and methods are described for leveraging machine learning to deliver time-sensitive media content offers to a consumer over an optimal device and channel. In various embodiments, a server system performs a method of transmitting media content offers to a user over an optimal device and channel. In implementations, the method captures metadata of at least one of the user's use of the plurality of devices, the user's media content preferences, the user's preferred transmission channels for receiving media content offers over the plurality of devices, and the user's preferred times for receiving media content offers. The method includes preparing a media content offer for transmission to the user; selecting, based on the captured metadata, a user device of the plurality of user devices, and a transmission channel of a plurality of transmission channels, to transmit the media content offer; and transmitting the media content offer to the selected user device over the selected transmission channel.

In embodiments, the server system includes a user account database for storing user account information associated with the user, the user account information including the plurality of user devices; a processor; and a non-transitory computer-readable having stored executable instructions for performing the method. In further embodiments, the server system includes a media content offer delivery server that transmits the media content offer. The delivery server may include some combination of a mail server, an ad server, an app server, and a web server.

In embodiments, the user devices may include desktop computers, laptops, tablets, cellphones, smartphones, wearable devices such as a smartwatch or head-mounted display, set-top boxes, gaming consoles, or televisions. In embodiments, the transmission channels may include text message, email, app notification, social media message, web ad, or a media streaming service ad.

In further embodiments, a graphical user interface is used for metadata capture and machine learning of a user's content, device, channel, and time preferences. In embodiments, a method of using the graphical user interface includes: the graphical user interface displaying first controls for registering a plurality of devices to receive media content offers and second controls for associating one or more transmission channels with each of the plurality of devices. The method further includes receiving data corresponding to a first user input at the graphical user interface actuating the first controls to register the plurality of devices; and receiving data corresponding to second user input at the graphical user interface actuating the second controls to associate one or more transmission channels with each of the registered plurality of devices. In various implementations, the graphical user interface is associated with a registered user account configured to receive media content offers from a server over the registered plurality of devices over the one or more transmission channels associated with each of the registered devices.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figure 1:
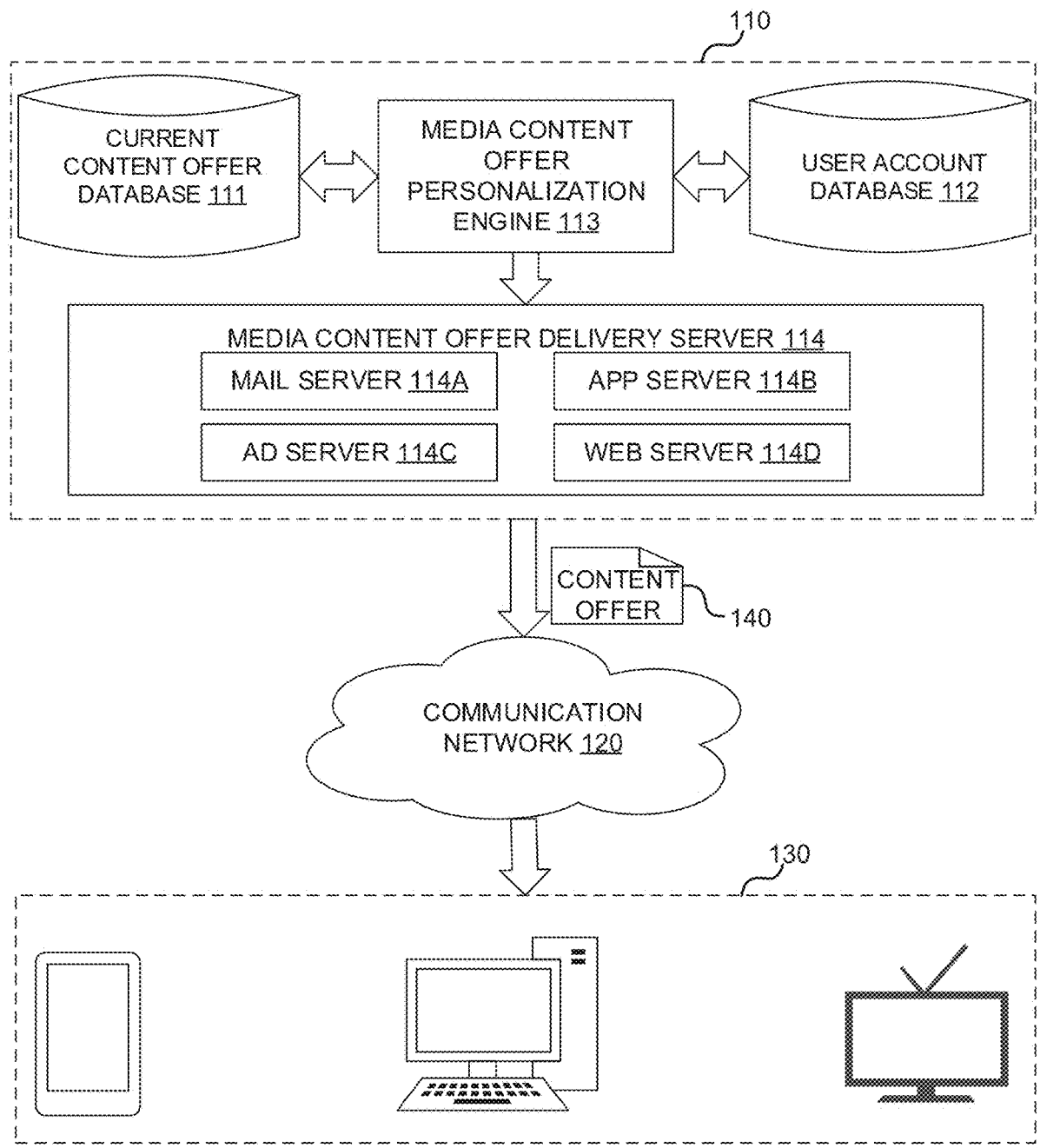
FIG. 1 is a high-level block diagram illustrating an example environment for delivery of media content offers in which the disclosure can be implemented.

The figures are not exhaustive and do not limit the disclosure to the precise form disclosed.

DETAILED DESCRIPTION

Today, many consumers own or carry multiple electronic devices (e.g., smartphones, laptops, wearable devices, etc.) that are capable of receiving time-sensitive content via multiple channels (e.g., notification, text message, e-mail, etc.). Depending on the time and location that the time-sensitive content is delivered, a particular type of consumer device may be optimal for receiving and presenting the content to the consumer. For example, if a consumer is shopping away from home at a particular store, it is preferable that time-sensitive content (e.g., promotional content relating to an on-sale movie at the store) be delivered to the consumer's phone in an easily accessible manner such as by text message. As another example, if a consumer is shopping online using a laptop, it is generally preferable that the time-sensitive content (e.g., an ad for a movie sold by an online store) be delivered to the consumer's laptop (e.g., by e-mail) instead of the consumer's smartphone (e.g., by notification).

Conventional methods of delivering time-sensitive content to a consumer are agnostic to the combination of the consumer's device and transmission channel. For example, as part of a promotional campaign for a film releasing in a week, a content creator may mass distribute an email offering discounted tickets to consumers identified as having interest in the film (e.g., as part of a mailing list). Although such a conventional method may identify and target consumers that are interested in the offer for discounted tickets, the targeted consumers may not receive the content in time, if at all. With the proliferation of promotional email content that is delivered to the typical consumer on a daily basis, many of the targeted consumers are unlikely to read the email. Additionally, many of the targeted consumers may rarely check their email, let alone promotional emails.

Accordingly, conventional methods of delivering time-sensitive content to an interested consumer frequently fail to deliver the content to the consumer at the appropriate time. Even worse, the consumer may be inconvenienced upon discovering expired time-sensitive content several days after delivery.

The technology disclosed herein addresses these problems. In accordance with embodiments, systems and methods are described for leveraging machine learning to deliver time-sensitive media content offers to a consumer over an optimal device and channel. In embodiments, a user is provided a graphical user interface that allows the user to select the devices and transmission channels to receive time-sensitive media content offers. In implementations of these embodiments, the user may utilize the graphical user interface to influence machine learning of the user's content, device, channel, and time preferences. Accordingly, by implementing the technology disclosed herein, time-sensitive media content offers may be delivered to a user through an optimal device and channel, thereby maximizing the likelihood that the user receives and accesses the content offer at the most appropriate time.

FIG. 1 is a high-level block diagram illustrating an example environment 100 for delivery of time-sensitive media content offers in which the invention can be implemented. As illustrated in environment 100, a server system 110 prepares and delivers time-sensitive media content offers 140 to a user device 130 over a network 120. In various embodiments, server system 110 finds the best offer if a product is offered by multiple vendors or distributors, and targets a registered user's particular device 130 over a particular transmission channel (e.g., text message, email, phone call, app notification, social media message, web ad, media streaming service ad, etc.) for transmission of media content offer 140. The account data of users registered to receive media content offers 140 may be stored in user account database 112 of server system 110.

In various embodiments, a transmitted media content offer 140 may include any time-sensitive offer of media content transmitted over a channel to a user based on machine learning of the user's content consumption, device use and/or preference, channel use and/or preference, and time preferences. In embodiments, the offer may be associated with a recently released video game, television series, or movie, (e.g., in theaters, streaming, Blu-Ray® Disc, etc.), an advanced screening of a movie or series, or a currently available movie or series. Additionally, the offer may include a discount or rebate selected from a plurality of vendors or distributors. For example, in one embodiment, media content offer 140 is a text message offering a discount on an action movie that is being offered for sale in a store where the user is presently shopping. In implementations of this example, the action movie may be selected by the system based on the user's preference for action movies and the producer of the movie. As another example, media content offer 140 may be a web ad offering a rebate on the purchase of a television series from a qualifying online store. In this example, the web ad may be generated and made available to the user through a web browser when the user is shopping online at a qualifying store using a desktop computer.

In a further example, media content offer 140 may be a mobile app notification offering an entire movie series for sale. In implementations of this example, the mobile app notification may be generated on the user's device after the user exits a theater that showed a movie in the series. In yet a further example, media content offer 140 may be a notification in a content streaming application that new media content is available for streaming. In implementations of this example, the notification may be generated on the user's smart television.

Server system 110 comprises a current content offer database 111, a user account database 112, a media content offer personalization engine 113, and a media content offer delivery server 114 for transmitting content offers 140 to devices 130. In embodiments, user account database 112 may store information associated with a plurality of user accounts registered to receive content offers 140. For example, database 112 may store for a user: a name, an address, phone number, an e-mail address, a list of registered devices, content offer delivery parameters specified by the user of the account (e.g., preferred content delivery times, devices, channels, and content), linked account information (e.g., shopping accounts, social media accounts, etc.), and metadata associated with the user.

In server system 110, a media content offer personalization engine or module 113 applies machine learning of a registered user's content consumption, device usage and/or preference, channel usage and/or preference, and time preferences to prepare a content offer for transmission to the user. In embodiments, a current content offer database 111 may store a list of active content offers 140 and a pointer to or record of the content offers 140. In such embodiments, the media content offer selected by engine 113 may be based on a selection of a content offer listed or stored in database 111. Alternatively, in other embodiments a unique content offer may be generated for a user using server system 110. In various embodiments, further described below, machine learning may be assisted by a graphical user interface whereby the user registers devices 130, specifies transmission channels, specifies content preferences, and links consumer accounts (e.g., content consumption accounts, social media accounts, shopping accounts) for performing machine learning.

In various implementations, the machine learning is based on gathered content metadata identifying the specific attributes of the media content consumed, purchased, accessed, or otherwise associated with the user's account. For example, the media content metadata may specify the content genre (e.g., action, education, drama, etc.), additional subcategories for the content genre (e.g., for educational genre: math, science, nature, literature, etc.), the lead character type of the content (e.g., female, male, alien, robot, etc.), the brand or franchise associated with the content, and other attributes of the content.

Additionally, the machine learning may be based on gathered device and channel metadata identifying transmission channels on which the user is most likely to timely receive and respond to a content offer 140. For example, the metadata may specify: the content offer transmission channels that were most successful in eliciting an immediate response and/or opt in from the user, the relative frequency with which the user's registered devices are accessed, and the like. Further still, the machine learning may be based on timing metadata identifying the days and times that the user is most responsive to delivered content offers 140.

Upon determination of a suitable content offer and transmission channel, media content offer delivery server 114 transmits the content offer 140 to a device 130. In embodiments, depending on the transmission channel that a content offer 140 is transmitted, media content offer personalization engine 113 may select a suitable server 114A-114D for delivery of content offer 140. Although illustrative servers 114A-114D are shown as transmitting content offer 140, it should be noted that in additional embodiments other suitable content offer delivery servers may transmit content offers depending on the content offer transmission channel.

For example, in embodiments where the content offer 140 is transmitted by e-mail, a mail server 114A may be used for transmission. As another example, in embodiments where the content offer 140 is transmitted via notification by a mobile application, an app server 114B supporting the mobile application may be used. In another example, where the content offer 140 is delivered as an ad on a webpage, ad server 114C may be used. In yet another example, where the content offer 140 is delivered over a content delivery network (e.g., a streaming network), a web server 114D may be used. In some embodiments, mail server 114A, app server 114B, ad server 114C, and web server 114D may be integrated as a single server.

Communication network 120 may comprise any communications network suitable for delivering the content offer 140 over a selected transmission channel (e.g., email, text message, app notification, social media, etc.) The type of protocol communication of network 120 may vary depending on the transmission channels used to deliver content offer 140 to a user device 130. Some non-limiting examples of protocols over which a user device 130 may connect to a network 120 include: cellular telecommunications protocols, such as GSM, UMTS, CDMA2000, LTE, or WiMAX; wired communications methods, such as cable, DSL, dial-up, or fiber-optic; or wireless communications methods, such as satellite communications, Wi-Fi, Bluetooth, or near-field communication (NFC). In some embodiments, a plurality of networking protocols may be utilized to deliver content offer 140 to user device 130.

A set of user devices 130 for a particular user may be any number of computing devices having a memory, processor, and a connectivity interface for receiving content offers 140 over network 120. Examples of user devices 130 may include desktop computers, laptops, tablets, cellphones, smartphones, wearable devices such as a smartwatch or head-mounted display, set-top boxes, gaming consoles, televisions and the like.

In particular embodiments, an application running on a mobile device 130 (e.g., a smartphones) enables server system 110 to employ location and time-based tracking of mobile device 130. In such embodiments, server system 110 may further optimize the determination of the time, device, and channel to transmit content offer 140 based on a user's expected location (e.g., home or away from home) and activity (e.g., active on devices or not active). The application may be an application downloaded to the user device 130 and stored in memory. In some embodiments, the application may be operating within another program running on mobile device 130, such as a web browser or cloud-based service.

Figure 2:
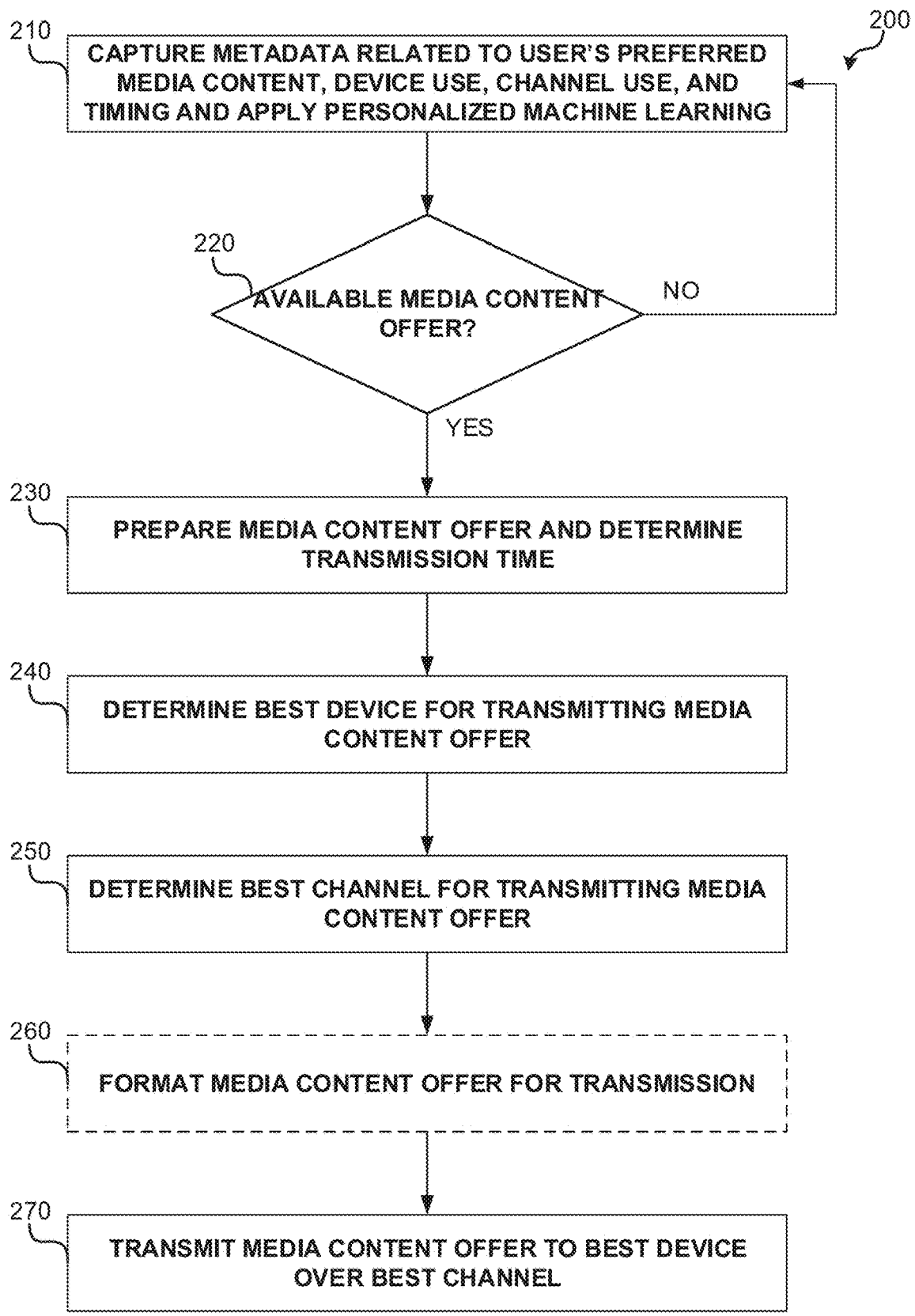
FIG. 2 is an operational flow diagram illustrating an example method for leveraging machine learning to deliver media content offers to a particular consumer device over a particular channel.

FIG. 2 is an operational flow diagram illustrating an example method 200 for leveraging machine learning to deliver a targeted media content offer 140 to a user over an optimal channel and device at an appropriate time. In various embodiments, method 200 may be implemented using server system 110. Prior to beginning method 200, a user of devices 130 may set up a user account for receiving content offers from server system 110. During account set up, user account data may be stored in database 112 of server system 110.

At operation 210, metadata related to the user's preferred media content, device use, channel use, and timing is captured by server system 110 and stored in database 112 as user data corresponding to the user's account. For example, server system captures content metadata identifying the specific attributes of the media content consumed, purchased, accessed, or otherwise associated with the user's account. In embodiments, the content metadata may identify attributes such as, for example, the type of format (e.g., streaming, physical disc, etc.) that the user prefers to view and/or purchase media content, the content genre (e.g., action, education, drama, etc.), additional subcategories for the content genre (e.g., for educational genre: math, science, nature, literature, etc.), and other attributes.

Additionally, server system 110 captures device and channel metadata identifying transmission channels and devices on which the user is most likely to timely receive and respond to a media content offer. For example, the metadata may reflect the fact that a user responds to about 20% of targeted media content offers delivered by text message and less that 1% of targeted media content offers delivered by e-mail. Further, the captured metadata may include timing metadata that identifies the days and times when the user is most responsive to delivered media content offers. In some embodiments, the timing metadata may be linked with the channel and device metadata to determine the times when certain devices and channels are more likely to be used by the user to view and respond to a media content offer.

Additionally, at operation 210 personalized machine learning of the captured metadata may be applied using media content offer personalization engine 113 of server system 110. Based on this machine learning, server system 110 may determine an optimal offer to transmit to a user, during an optimal time, and over an optimal device and channel. In various embodiments, a graphical user interface may be provided to a user to influence and direct machine learning of the user's content, device, channel, and time preferences.

Figure 3:
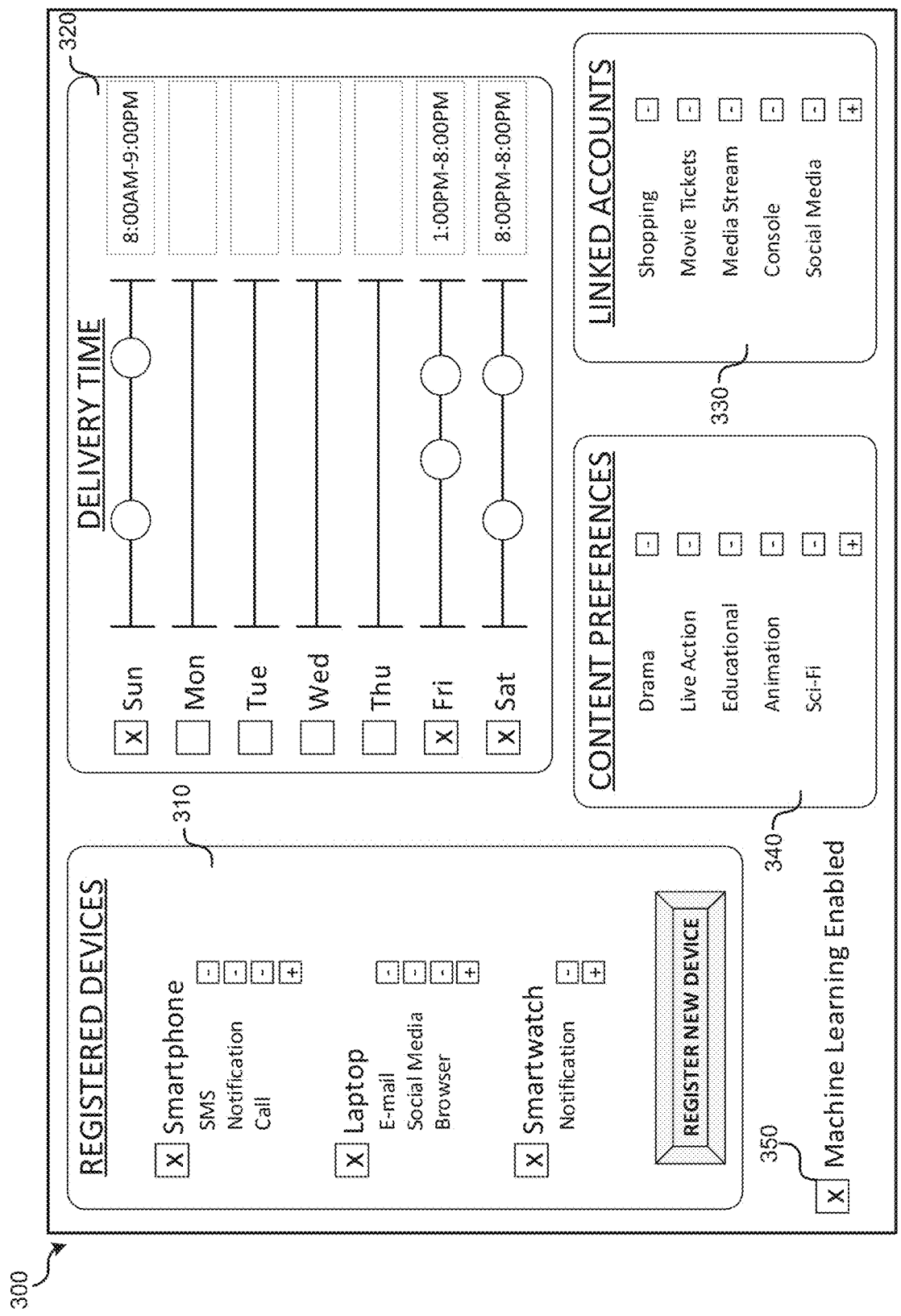
FIG. 3 illustrates an example graphical user interface that may be implemented in accordance with an embodiment of the disclosure.

FIG. 3 illustrates one such example graphical user interface 300 that may be implemented in accordance with an embodiment. In embodiments, graphical user interface 300 may be provided as part of an application interface (e.g., through a mobile app that is downloaded), a web-based interface (e.g., a webpage), or other suitable interface. For example, a user may access graphical user interface 300 after registering an account to receive media content offers from server 110. As part of this process, all user account data may be stored in user account database 112 of server system 110.

Example graphical user interface 300 displays a registered device and transmission channel interface 310, a delivery time interface 320, a linked account interface 330, a content preference interface 340, and a machine learning checkbox 350 for enabling or disabling machine learning. In embodiments, interfaces 310-350 may be displayed as windows, tabs, or menus.

During use of graphical user interface 300, a user actuates controls (e.g. a "register new device" button) of interface 310 to register a plurality of user devices (e.g., smartphone, laptop, smartwatch, television, gaming console) for receiving media content offers over one more selected communication channels. During use, the user may uncheck or remove a registered device to prevent media content offer delivery to that device. Additionally, the user may add or remove transmission channels for each device. As illustrated in this embodiment, the user's smartphone is registered and selected to receive media content offers by text message, app notification, or phone call. Additionally, the user's laptop is registered and selected to receive media content offers by e-mail, via a social media account message, or internet browser (e.g., web ad).

In embodiments where transmission channels may overlap for registered devices (e.g., both a smartphone and laptop may receive email), the user's selection of only one device to receive content offers over the transmission channel may be used by server system 110 to influence the formatting and timing of a media content offer transmitted over the transmission channel. For example, if a user registers a smartphone and laptop, but only designates the laptop for email transmission, media content offers transmitted by email may include elaborate graphical elements and video. Conversely, if the user only designates the smartphone for email transmission, media content offers transmitted by email may include simple text and graphics optimized for a smartphone screen.

Delivery time interface 320 includes controls (e.g., buttons and sliders) that may be actuated by the user to set date and time preferences for receiving media content offers. In embodiments, delivery date and time preferences may be specified for each device and/or each transmission channel. Linked accounts interface 330 includes controls for linking the media content offer user account with a variety of accounts from which metadata may be gathered to further optimize and customize media content offers transmitted to the user. For example, the user account may be linked with an online shopping account, a media streaming account, a social media account, a gaming console account, a movie tickets website account, and other accounts. In this manner, metadata may be gathered about the user's media content consumption habits, media purchasing habits, and other habits relevant to transmitting an optimal media content offer.

Content preference interface 340 includes controls for selecting or biasing attributes of the content in the content offers transmitted to the user. For example, as illustrated in this embodiment, the user may bias the content genre. In further embodiments, the user may specify additional content attributes such as, for example, the type of format (e.g., streaming, physical disc, etc.) that the user prefers to view and/or purchase media content.

In some embodiments, a machine learning toggle 350 may be provided such that the user may enable or disable machine learning of the user's behavior. For example, disabling machine learning may disable tracking of the user's linked accounts. In some embodiments, disabling machine learning disables media content offer delivery.

In various embodiments, a user may actuate the controls of interfaces 310-350 by applying finger swiping gestures on a touch screen interface, clicking and dragging a mouse, using a remote control, using a keyboard, and using other user interface input methods. Additionally, various controls may be used in place of the illustrated controls such as, for example, buttons, toggles, sliders, navigational components, and the like.

In various embodiments, the information set by the user (registered devices, transmission channels, media content preferences, linked accounts, etc.) using interface 300 may be stored as user account data at database 112 of server system 110.

With reference to method 200, following metadata capture and personalized machine learning at operation 210, at decision block 220 it is determined if a media content offer is available for transmission to the user, and if so, which vendor or distributor has the best offer. In embodiments, the availability of a media content offer may be based on a combination of personalized machine learning applied to the captured user metadata and a media content offer trigger. The media content offer trigger, may be time-based (e.g., optimal date and time for offer, a new promotion for content that matches the user's preferences, etc.), location-based (e.g., user enters store, user leaves theater, user is likely to be at home, etc.), device-based (e.g., an NFC chip of the user's mobile device triggers an offer), or some combination thereof. In some embodiments, the availability of a media content offer is based on media content offers currently listed in database 111.

At operation 230, the media content offer is prepared for transmission and an optimal time for transmission is determined based on machine learning of the metadata. In embodiments where method 200 is implemented with a graphical user interface 300, for example, the transmission time may be limited to the times specified using interface 320.

At operation 240, a best device for transmitting the media content offer is determined based on the machine learning of the metadata. For example, the selected device may include one of: a laptop, a smartphone, a head-mounted display, a gaming console, a television, and the like. In embodiments where method 200 is implemented with a graphical user interface 300, for example, the best device may be selected from the list of devices the user has registered and activated for receiving media content offers.

At operation 250, a best channel for transmitting the media content offer is determined based on the machine learning of the metadata. For example, the selected transmission channel may include one of: text message, email, phone call, app notification, social media message, web ad, media streaming service ad, and the like. In embodiments, the best channel is selected from a plurality of channels available over the selected device. In particular implementations, the best channel may be selected based on the selected device, the selected time, the selected content, or some combination thereof.

At optional operation 260, the media content offer may be formatted prior to transmission. In embodiments of operation 260, the media content offer is formatted based on the selected device and channel for transmission. For example, a media content offer selected for transmission by email to a laptop may include elaborate graphics and video. By contrast, the same media content offer selected for transmission by text message to a cellphone may be simplified and reformatted by removing all graphics, reducing text, and reformatting the remaining text (e.g., by using capital letters and spacing). In additional embodiments, the media content offer may be personalized depending on the date and time of transmission.

At operation 270, the targeted media content offer is transmitted to the user's best device over the best channel. For example, an app server 114B may transmit a media content offer as data that generates a pop-up notification on the user's mobile device. As another example, ad server 114C may transmit a media content offer as a web ad to the user's browser.

As would be appreciated by one having skill in the art, method 200 may be iteratively repeated to generate personalized media content offers that are transmitted to a user during an appropriate time to an appropriate device through an appropriate channel. Accordingly, by implementing the technology disclosed herein, the likelihood that the user receives and accesses a content offer may be dramatically improved.

Figure 4:
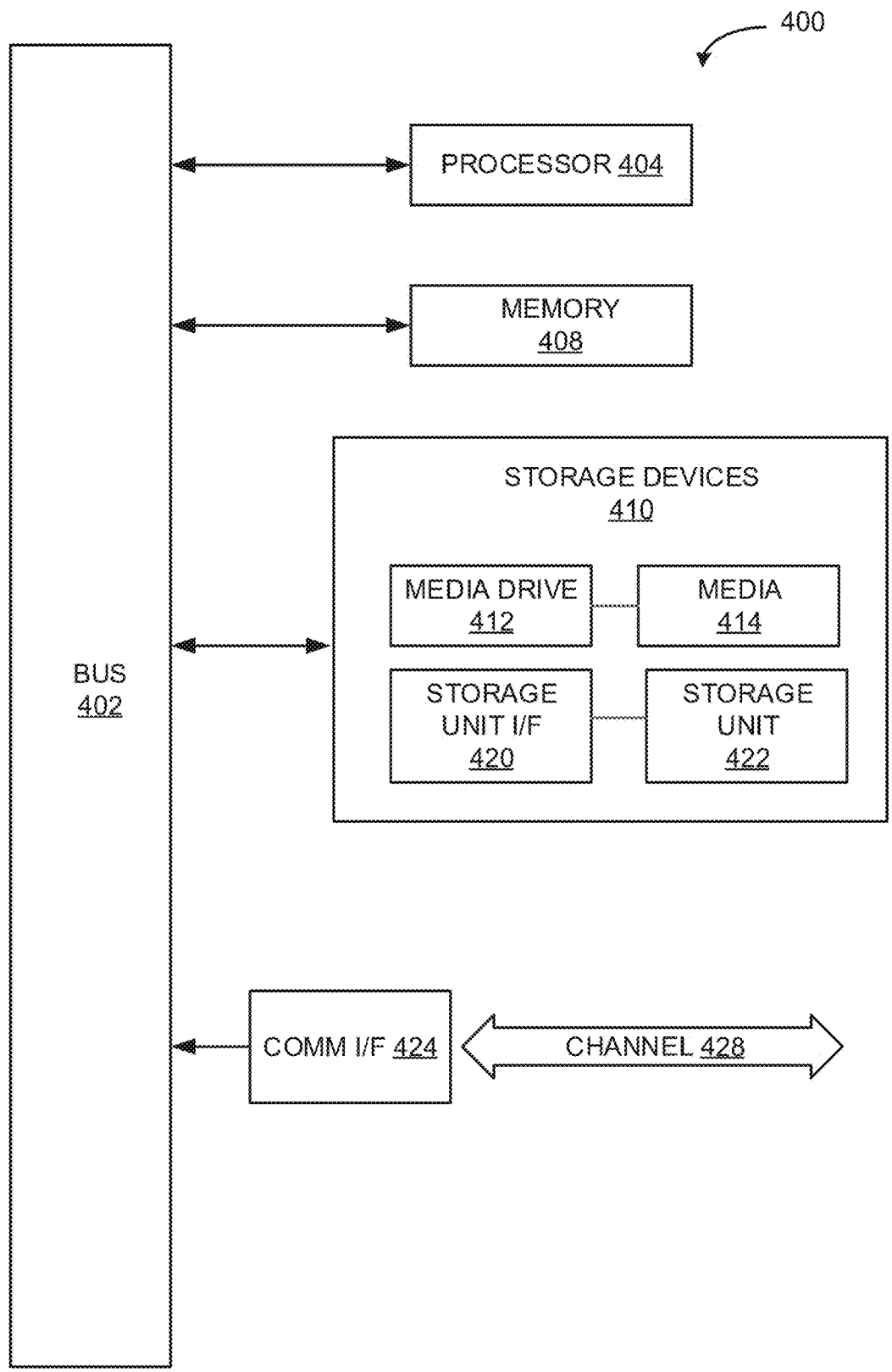
FIG. 4 illustrates an example computing module that may be used to implement various features of the system and methods disclosed herein.

FIG. 4 illustrates an example computing module that may be used to implement various features of the systems and methods disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a CD, DVD, or Blu-ray drive (R or RW), or other removable or fixed media drive might be provided. Accordingly, storage media 414 might include, for example, a hard disk, a solid state drive, magnetic tape, cartridge, optical disk, a CD, DVD, Blu-ray or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for transmitting media content promotions from a server to one of a plurality of user devices utilized by a user, the method comprising:
receiving a selection, by the user, of (1) one or more accounts to link to a user account that is configured to receive media content promotions, and (2) at least one of media content preferences, user devices, transmission channels, or times for receiving media content promotions;
capturing, based on use of the plurality of user devices by the user, metadata indicating at least one of media content preferences of the user, the use of the plurality of user devices by the user, transmission channels preferred by the user for receiving media content promotions over the plurality of user devices, times preferred by the user for receiving media content promotions, or use of the one or more accounts;
applying machine learning to the metadata, wherein the machine learning is applied based on the at least one of the media content preferences, the use of the plurality of user devices, the transmission channels, the times, or the use of the one or more accounts that are included in the metadata and that indicate at least relative frequencies with which the user responded at different times to media content promotions transmitted to the plurality of user devices via a plurality of transmission channels, and wherein the machine learning is further applied based on the at least one of media content preferences, user devices, transmission channels, or times selected by the user;
identifying a first media content promotion for transmission to the user based on the machine learning and a trigger that specifies, for the first media content promotion, at least one of a date and time when the first media content promotion will be transmitted, a location at which the first media content promotion will be transmitted, or a device to which the first media content promotion will be transmitted;
using at least the machine learning to:
select a first user device of the plurality of user devices to transmit the first media content promotion to, and
select a first transmission channel from the plurality of transmission channels to transmit the first media content promotion over; and
transmitting the first media content promotion to the first user device over the first transmission channel.

2. The method of claim 1,
wherein the plurality of user devices comprises a mobile phone, a laptop, a desktop computer, a television, a wearable device, or a combination thereof; and
wherein the plurality of transmission channels comprises email, text message, application notification, a website advertisement, or a combination thereof.

3. The method of claim 1, further comprising formatting the first media content promotion prior to transmission based on the first user device and the first transmission channel.

4. The method of claim 1, further comprising determining a time for transmitting the first media content promotion using at least the machine learning.

5. The method of claim 4, wherein the machine learning is further applied based on information included in the metadata indicating days and times that the user is most responsive to delivered media content promotions.

6. The method of claim 1, wherein the selection by the user is received via a graphical user interface.

7. The method of claim 1, wherein selecting the first transmission channel is based on the first user device, a determined time for transmitting the first media content promotion, and the first media content promotion.

8. The method of claim 1, wherein the first media content promotion comprises a discount offer or rebate offer.

9. The method of claim 1, further comprising preparing the first media content promotion for transmission to the first user device based on the machine learning.

10. The method of claim 1, wherein the trigger specifies at least one of:
transmission of the first media content promotion on a predefined date and at a predefined time;
transmission of the first media content promotion when the user enters a predefined location;
transmission of the first media content promotion when the user is predicted to be at a predefined location;
transmission of the first media content promotion when the user leaves a predefined location; or
transmission of the first media content promotion when a user device triggers the transmission of the first media content promotion.

11. A server system for transmitting media content promotions to one of a plurality of user devices utilized by a user, the server system comprising:
a processor; and
a non-transitory computer-readable medium operatively coupled to the processor, and having instructions stored therein, that when executed by the processor cause the server system to:
receive a selection, by the user, of (1) one or more accounts to link to a user account that is configured to receive media content promotions, and (2) at least one of media content preferences, user devices, transmission channels, or times for receiving media content promotions,
capture, based on use of the plurality of user devices by the user, metadata indicating at least one of media content preferences of the user, the use of the plurality of user devices by the user, transmission channels preferred by the user for receiving media content promotions over the plurality of user devices, times preferred by the user for receiving media content promotions, or use of the one or more accounts,
apply machine learning to the metadata, wherein the machine learning is applied based on the at least one of the media content preferences, the use of the plurality of user devices, the transmission channels, the times, or the use of the one or more accounts that are included in the metadata and that indicate at least relative frequencies with which the user responded at different times to media content promotions transmitted to the plurality of user devices via a plurality of transmission channels, and wherein the machine learning is further applied based on the at least one of media content preferences, user devices, transmission channels, or times selected by the user,
identify a first media content promotion for transmission to the user based on the machine learning and a trigger that specifies, for the first media content promotion, at least one of a date and time when the first media content promotion will be transmitted, a location at which the first media content promotion will be transmitted, or a device to which the first media content promotion will be transmitted, use at least the machine learning to:
    select a first user device of the plurality of user devices to transmit the first media content promotion to; and
    select a first transmission channel from the plurality of transmission channels to transmit the first media content promotion over; and
transmit the first media content promotion to the first user device over the first transmission channel.

12. The server system of claim 11, further comprising a media content promotion delivery server that transmits the first media content promotion to the first user device over the first transmission channel.

13. The server system of claim 12, wherein the media content promotion delivery server comprises a mail server, an advertisement server, an application server, a web server, or a combination thereof.

14. The server system of claim 11,
    wherein the plurality of user devices comprises a mobile phone, a laptop, a desktop computer, a television, a wearable device, or a combination thereof; and
    wherein the plurality of transmission channels comprises email, text message, application notification, a website advertisement, or a combination thereof.

15. The server system of claim 11, wherein the instructions, when executed by the processor, further cause the server system to format the first media content promotion for transmission based on the first user device and the first transmission channel.

16. The server system of claim 11, wherein the first media content promotion is prepared for transmission based on the metadata.

17. The server system of claim 11, wherein the instructions, when executed by the processor, further cause the server system to determine a time for transmitting the first media content promotion using at least the machine learning.

18. A method, comprising:
    receiving a selection, by a user, of (1) one or more accounts to link to a user account that is configured to receive media content promotions, and (2) at least one of media content preferences, user devices, transmission channels, or times for receiving media content promotions;
    capturing, based on use of a plurality of user devices by the user, metadata indicating at least one of media content preferences of the user, the use of the plurality of user devices by the user, transmission channels preferred by the user for receiving media content promotions over the plurality of user devices, times preferred by the user for receiving media content promotions, or use of the one or more accounts;
    applying machine learning to the metadata, wherein the machine learning is applied based on the at least one of the media content preferences, the use of the plurality of user devices, the transmission channels, the times, or the use of the one or more accounts that are included in the metadata and that indicate at least relative frequencies with which the user responded at different times to media content promotions transmitted to the plurality of user devices via a plurality of transmission channels, and wherein the machine learning is further applied based on the at least one of media content preferences, user devices, transmission channels, or times selected by the user; and
    identifying a first media content promotion for transmission to a first user device included in the plurality of user devices based on the machine learning and a trigger that specifies, for the first media content promotion, at least one of a date and time when the first media content promotion will be transmitted, a location at which the first media content promotion will be transmitted, or a device to which the first media content promotion will be transmitted.

19. The method of claim 18, further comprising:
    displaying to the user a graphical user interface associated with a registered user account that is configured to receive media content promotions from a server, the media content promotions comprising the first media content promotion that is identified and prepared for transmission to the user; and
    receiving data corresponding to user input at the graphical user interface actuating controls to link the registered user account with a shopping account, media streaming account, social media account, gaming console account, or combination thereof.

20. The method of claim 18, further comprising preparing the first media content promotion for transmission to the first user device based on the machine learning.

* * * * *